United States Patent [19]
Hashimoto

[11] Patent Number: 5,998,513
[45] Date of Patent: Dec. 7, 1999

[54] RUBBER COMPOSITION CONTAINING AN ASPHALTENE-CONTAINING SOFTENING AGENT

[75] Inventor: Takatsugu Hashimoto, Tokyo, Japan

[73] Assignee: Bridgestone Corporation, Tokyo, Japan

[21] Appl. No.: 09/252,213

[22] Filed: Feb. 18, 1999

[30] Foreign Application Priority Data

Feb. 23, 1998 [JP] Japan .................................. 10-040184

[51] Int. Cl.$^6$ ...................................................... C08K 5/01
[52] U.S. Cl. ................................................................ 524/64
[58] Field of Search ................................................. 524/64

[56] References Cited

U.S. PATENT DOCUMENTS

| | | | |
|---|---|---|---|
| 2,431,386 | 11/1947 | Fischer | 524/64 |
| 2,540,252 | 2/1951 | Fischer | 524/64 |
| 2,578,001 | 12/1951 | Cubberley et al. | 524/64 |
| 3,575,908 | 4/1971 | Bathgate | 524/64 |
| 3,639,322 | 2/1972 | Bathgate et al. | 524/64 |
| 4,430,465 | 2/1984 | Abbott | 524/64 |
| 4,591,611 | 5/1986 | Jenkins et al. | 524/64 |
| 4,595,636 | 6/1986 | Wiercinski et al. | 428/489 |
| 4,600,635 | 7/1986 | Wiercinski et al. | 428/220 |

FOREIGN PATENT DOCUMENTS

| | | |
|---|---|---|
| 0 708 137 A1 | 4/1996 | European Pat. Off. . |
| 2516364 | 11/1975 | Germany . |
| 61-76539 | 4/1986 | Japan . |

*Primary Examiner*—Rabon Sergent
*Attorney, Agent, or Firm*—Sughrue, Mion, Zinn, Macpeak & Seas, PLLC

[57] ABSTRACT

A rubber composition is a mixture of 100 parts by weight of at least one rubber component selected from the group consisting of a natural rubber and a synthetic rubber and 1 to 120 parts by weight of a softening agent containing 0.1 to 4% by weight of asphaltene. The rubber composition simultaneously has a high high-loss property, a high fracture property and a good workability.

3 Claims, No Drawings

RUBBER COMPOSITION CONTAINING AN ASPHALTENE-CONTAINING SOFTENING AGENT

BACKGROUND OF THE INVENTION

1. Field of the Invention

The present invention relates to a rubber composition, and more particularly, to a rubber composition improved in high-loss property and fracture property due to an asphaltene-containing softening agent blended thereinto in a specific amount.

2. Description of the Related Arts

Asphalt has heretofore been added to rubber compositions for various purposes. For example, European Patent Publication No. 708137 discloses that a tire free from black stains on the surface even after being left standing for a long period of time can be prepared by forming a tire tread from a rubber composition containing asphalt.

It has been known that the high-loss property and fracture property of a rubber composition can be improved by compounding asphalt with the rubber composition. However, since asphalt is viscous and tacky, it is adhered or stuck to a mixer or the like during a mixing process, thereby failing to mix the asphalt into a rubber composition in a prescribed amount. Even when asphalt can be blended into a rubber composition in a desired amount, the fracture property is occasionally not sufficiently exhibited because of an insufficient dispersion thereof in the rubber composition.

SUMMARY OF THE INVENTION

As the result of intensive studies by the inventor to enhance the high-loss property and the fracture property of a rubber composition by mixing asphalt with a rubber composition, it has been found that the physical properties of a rubber composition can be improved more efficiently by blending a softening agent containing a specific amount of asphaltene, particularly a softening agent containing a large amount of aromatic hydrocarbons. The present invention has been completed on the basis of this finding.

In the present invention, the above problems have been solved by blending a softening agent in which asphalt has been mixed in advance or in which a suitable amount of main components of asphalt has been added during the purfiying process, in place of mixing the asphalt directly into a rubber composition.

Accordingly, the present invention provides a rubber composition comprising 100 parts by weight of at least one rubber component selected from the group consisting of a natural rubber and a synthetic rubber and 1 to 120 parts by weight of a softening agent containing 0.1 to 4% by weight of asphaltene. It is preferable that the softening agent has an aromatic carbon content (% CA) of 18 or more when measured by a ring analysis.

To facilitate the purification process of the softening agent, it is preferable that the softening agent is prepared by mixing asphalt with a processing oil conventionally used as a softening agent. The asphalt to be used in the present invention is preferably a straight asphalt.

DESCRIPTION OF THE PREFERRED EMBODIMENTS

In the present invention, a natural rubber and a synthetic rubber can be used as the rubber component alone or in combination. The synthetic rubber is not particularly limited, and may be exemplified by butadiene rubber (BR), isoprene rubber (IR), styrene-butadiene copolymers (SBR), butyl rubber (IIR) and ethylene-propylene-diene terpolymers (EPDM), etc. The rubber component can be suitably selected in accordance with the application.

It is necessary that the softening agent used in the present invention contains asphaltene in an amount of 0.1 to 4% by weight and preferably 0.3 to 3% by weight based on the total weight of the softening agent. When the content of asphaltene is less than 0.1% by weight, the high-loss property is not sufficiently exhibited. When the content of asphaltene exceeds 4% by weight, the adhesiveness of the resulting rubber composition increases excessively to extremely deteriorate the workability.

The softening agent used in the present invention preferably has % $C_A$ of 18 or more, more preferably 23 or more and most preferably 25 or more when measured by the ring analysis.

When % $C_A$ is less than 18, the high-loss property is occasionally not sufficiently exhibited even when an appropriate amount of asphaltene is contained in the softening agent.

In view of workability during the mixing step for preparing the rubber composition (easiness of introducing the softening agent into a kneader), the softening agent used in the present invention preferably has a kinematic viscosity of 100 mm$^2$/sec or less, more preferably 90 mm$^2$/sec or less and most preferably 80 mm$^2$/sec or less at 100° C.

To prevent the environmental pollution, the content of the substances extractable by dimethyl sulfoxide (DMSO) in the softening agent used in the present invention is preferably less than 3% by weight. This content is determined in accordance with the method of IP346 and referred to as Polycyclic Aromatics (hereinafter abbreviated as PCA).

The process for preparing the softening agent used in the present invention is not particularly limited. The asphalt may be mixed with other materials for the softening agent in advance. Alternatively, a known softening agent may be purified in the presence of a suitable amount of main components of asphalt to give the softening agent for use in the present invention. In view of facilitating the preparation of the softening agent and reducing the production cost, it is preferable that the softening agent is prepared by dissolving the asphalt into a processing oil. The term "processing oil" used herein may include an extender oil and a blending oil. The types and kinds of the asphalt and processing oil to be mixed in advance are not limited.

As the processing oil, those generally used in the rubber industry such as a high aromatic oil, a naphthenic oil and a paraffinic oil can be used alone or in combination. The high aromatic oil is preferable due to its high % $C_A$ and its ability of providing the resulting rubber composition with a high high-loss property.

As the asphalt, a straight asphalt is preferably used because the high-loss property is efficiently provided.

The asphalt preferably has a penetration of 20 to 100, more preferably in the range of 40 to 90 and most preferably in the range of 60 to 80. When the asphalt being used has a penetration less than 20, the dispersion of the asphalt in the processing oil is poor to likely cause a variation in physical properties of the resulting rubber composition and increase the viscosity of the resulting softening agent thereby deteriorating the workability. When the penetration of asphalt exceeds 100, the high-loss property of the obtained rubber composition may be insufficient.

The amount of the asphalt added to the processing oil is not particularly limited. To obtain the high high-loss property and a suitable workability by avoiding a detrimental increase in the viscosity and to prevent uneven dispersion of the asphaltene, the amount of the asphalt to be added to the processing oil is preferably 8 to 40% by weight based on the amount of the processing oil.

The softening agent containing the asphalt may be added as a blending oil during the mixing process of the rubber components or may be added as an extender oil in the preparation of a synthetic rubber.

The addition amount of the softening agent containing the asphalt to the rubber composition is preferably 1 to 120 parts by weight and more preferably 1 to 100 parts by weight per 100 parts by weight of the rubber component in view of the balance between the high high-loss property and the workability. The above addition amount includes the amount of the softening agent added as en extender oil in the preparation of a synthetic rubber and the amount of the softening agent added as a blending oil in the mixing process of the rubber components.

The addition amount, when used as an extender oil in the preparation of synthetic rubber, is preferably 5 to 45% by weight, more preferably 10 to 40% by weight and most preferably 12 to 38% by weight based on the total weight of the rubber component in the synthetic rubber. The addition amount, when added as a blending oil in the mixing process of the rubber composition, is preferably 0.2 to 45% by weight, more preferably 0.5 to 40% by weight and most preferably 1 to 35% by weight based on the total weight of the rubber composition.

A portion of the softening agent containing asphalt which is used in the rubber composition of the present invention may be replaced by another conventionally used softening agent. When another softening agent is used, it is preferable that the total amount of the softening agents is within the above preferable range. To sufficiently exhibit the effect of the present invention, the softening agent containing asphalt is preferred to be used in an amount of 50% by weight or more of the total amount of the asphaltene-containing softening agent and another softening agent.

The rubber composition of the present invention may contain a reinforcing filler such as carbon black and silica preferably in an amount of 20 to 150 parts by weight, more preferably 25 to 120 parts by weight and most preferably 30 to 105 parts by weight per 100 parts by weight of the rubber component.

A crosslinking agent is added to the rubber composition of the present invention in an amount usually employed in the art and the resulting mixture is heated in a manner known in the art to give a rubber product. As the crosslinking agent, any crosslinking agent generally used in the rubber industry, such as an organic peroxide, sulfur and an organic sulfur compound can be used. When sulfur or an organic sulfur compound is used, a vulcanization accelerator generally used in the rubber industry can be used in the ordinary manner.

The rubber composition of the present invention may further contain inorganic fillers generally used in the rubber industry in an amount of 5 to 200 parts by weight, preferably 25 to 120 parts by weight and more preferably 32 to 105 parts by weight per 100 parts by weight of the rubber component in addition to the above components.

The rubber composition of the present invention may further contain other ingredients generally used in the rubber industry such as antioxidants in addition to the above components.

As described in detail, the rubber composition of the present invention exhibits a sufficiently high high-loss property and an excellent fracture property without any decrease in workability because the softening agent containing a specific amount of asphaltene is used. Therefore, the rubber composition can be advantageously used for various rubber products such as tires, vibration isolation rubbers and dock fenders.

EXAMPLES

The present invention is described more specifically with reference to the following examples and comparative examples. However, it should be construed that the present invention is not limited to the examples.

Properties of the asphalt, the softening agents and rubber compositions were measured in accordance with the following methods.

(1) Asphalt
  (a) Penetration
  The penetration of asphalt was measured at 25° C. according to the method of JIS K2207.
(2) Softening Agent
  (a) Ring Analysis
  The content of aromatic carbons (% $C_A$), the content of naphthenic ring carbons (% $C_N$) and the content of paraffinic chain carbons (% $C_P$), each in terms of % by weight, in a softening agent were measured in accordance with the method of ASTM D-2140.
  (b) Kinematic Viscosity
  The kinematic viscosity was measured at 100° C. in accordance with the method of JIS K2283-1993.
  (c) Aniline Point
  The aniline point was measured in accordance with the method of JIS K2256-1985.
  (d) PCA
  PCA was represented by the amount (% by weight) of DMSO extract in accordance with the method of IP346.
(3) Properties of Rubber Composition
  (a) Softening Property
  Mooney viscosity $ML_{1+4}$ of an unvulcanized rubber composition was measured at 130° C. in accordance with the method of JIS K6300-1994 using a Mooney viscometer manufactured by TOYO SEIKI Co., Ltd. The results of the measurement were evaluated by the following ratings:

Good: good softening property

Fair: excessive softening

Poor: poor softening (b) Fracture Properties

Test pieces were prepared from a vulcanized rubber sheet (150 mm×150 mm×2 mm) by using a blade of JIS No. 3 in accordance with the method of Japanese Industrial Standard K6301-1995. The elongation at break and the tensile strength at break of the test pieces were measured by a tensile tester (STROGRAPH AR-1 manufactured by TOYO SEIKI Co., Ltd.). The results of the measurement were evaluated by the following ratings:

Good: large elongation and high strength at break

Fair-a: large elongation but low strength at break

Fair-b: small elongation but high strength at break

Poor: small elongation and low strength at break (c) High-loss Property

The values of tan δ of a vulcanized rubber sheet (5 mm×45 mm×2 mm) was measured at 0° C. and 25° C. using a viscoelastometer (RHEOGRAPHSOLID L-1R manufactured by TOYO SEIKI Co., Ltd.). The results of the measurement were evaluated by the following ratings:

Excellent: sufficiently high high-loss property

Fair: high-loss property sufficient for practical use
Poor: poor high-loss property
(d) Workability in Mixing The workability in mixing was evaluated by the extent of adhesion of the composition to rolls of a kneader. When no adhesion to rolls occurred and mixing could be carried out without any problem, the workability was rated as excellent. When some adhesion was observed but mixing could be carried out without much trouble, the workability was rated as good. When a considerable adhesion to rolls occurred, the workability was rated as poor.

(e) Workability in Extending

The workability in extending an softening agent throughout the rubber component was evaluated in terms of the adhesion of softening agent to a vessel. The results were expressed by either as good for less adhesion or as poor for considerable adhesion.

The test pieces were prepared in the manner shown below.

(A) Preparation of Softening Agents

An accurately weighed amount of a commercially available high aromatic oil (AROMACS 3 manufactured by FUJI KOSAN Co., Ltd.) was heated to 70° C., to which an accurately weighed amount of a straight asphalt was added while keeping it at 70° C. When weighing the straight asphalt, it was heated to 85° C. in order to lower its viscosity. Thereafter, the mixture was continuously stirred for 5 minutes to prepare a softening agent being used in the present invention. The properties of the high aromatic oils are shown in Table 1.

TABLE 1

|  | High Aromatic Oils | | | | |
| --- | --- | --- | --- | --- | --- |
|  | 1 | 2 | 3 | 4 | 5 |
| Ring analysis | | | | | |
| % $C_A$ | 26.00 | 18.00 | 22.00 | 24.00 | 26.00 |
| % $C_N$ | 28.00 | 22.00 | 25.00 | 27.00 | 26.00 |
| % $C_P$ | 46.00 | 60.00 | 53.00 | 49.00 | 48.00 |
| kinematic viscosity (100° C.) | 40.00 | 16.00 | 36.00 | 37.00 | 70.00 |
| aniline point (° C.) | 76.00 | 95.00 | 84.00 | 80.00 | 92.00 |
| PCA (% by weight) | 2.50 | 2.00 | 2.20 | 2.50 | 2.3 |

(B) Preparation of Oil-Extended Synthetic Rubber

Into a 5-liter pressure-resistant reactor, 1200 g of dry cyclohexane, 80 g of styrene and 120 g of butadiene were placed and the contents were adjusted to 50° C. After 60 mmol of tetrahydrofuran were added as a randomizer, 1.6-N n-hexane solution of n-butyllithium was added so that 1.6 mmol of n-butyllithium were added as a polymerization initiator to the resultant solution. The polymerization was then conducted at 50° C. for 2 hours. After the polymerization was completed, a solution of 0.5 g of 2,6-di-t-butyl-p-cresol (BHT) in 5 ml of isopropyl alcohol was added to the polymerization system to terminate the polymerization. After the termination of the polymerization, a softening agent was added in accordance with the formulation shown in Table 2 and the obtained product was dried in a conventional method to obtain an oil-extended synthetic rubber.

(C) Preparation of Test Pieces

Components for a master batch with the formulation shown in Table 2 were mixed together in a kneader and the mixed product was formed into a sheet by rolls having a surface temperature of 70° C. The master batch thus obtained and other components for the final mixing were mixed together in a kneader and the mixed product was formed into a sheet by rolls having a surface temperature of 70° C. The sheet thus obtained was charged into a suitable molding die and vulcanized at 160° C. under a pressure of 30 kg/cm² for 15-minute heating. The vulcanized product was taken out of the molding die and test pieces having a prescribed size were taken from the obtained product.

TABLE 2

|  | Formulation (parts by weight) | |
| --- | --- | --- |
|  | (1) | (2) |
| rubber component | 100 *1 | 100 |
| carbon black *2 | 70 | 70 |
| stearic acid | 1 | 1 |
| softening agent *3 | varied | 37.5 |
| zinc oxide | 3 | 3 |
| vulcanization accelerator D *4 | 0.6 | 0.6 |
| vulcanization accelerator DM *5 | 0.7 | 0.7 |
| vulcanization accelerator NS *6 | 0.35 | 0.35 |
| antioxidant *7 | 1.5 | 1.5 |
| sulfur | 1.5 | 1.5 |

Note:
*1: Emulsion-polymerized SBR, #1500, tradename, manufactured by JSR Corporation.
*2: N220 ISAF, SIEST 6, tradename, manufactured by TOKIA CARBON Co., Ltd.
*3: Softening agents prepared by using respective high aromatic oils shown in Table 1. The softening agent was used as a blending oil in Formulation (1) and as an extender oil in Formulation (2).
*4: NOCCELER D, tradename, manufactured by OUCHI SHINKO KAGAKU KOGYO Co., Ltd.
*5: NOCCELER DM, tradename, manufactured by OUCHI SHINKO KAGAKU KOGYO Co., Ltd.
*6: NOCCELER NS, tradename, manufactured by OUCHI SHINKO KAGAKU KOGYO Co., Ltd.
*7: NOCRAC 6C, tradename, manufactured by OUCHI SHINKO KAGAKU KOGYO Co., Ltd.

The results obtained by using the rubber compositions with Formulation (1) shown in Table 2 are shown in Tables 3A to 3D.

TABLE 3A

|  | Example 1 | Example 2 | Example 3 | Example 4 |
| --- | --- | --- | --- | --- |
| Softening agent | | | | |
| addition amount (phr) *1 | 37.5 | 37.5 | 37.5 | 37.5 |
| amount of asphalt added (% by weight) | 5 | 10 | 25 | 10 |
| method of mixing | A *2 | A | A | A |
| high aromatic oil used | 1 | 1 | 1 | 2 |
| content of asphaltene (% by weight) | 0.50 | 1.00 | 2.50 | 1.00 |
| % $C_A$ (% by weight) | 26 | 26 | 26.5 | 20 |
| kinematic viscosity | 62 | 71 | 96 | 58 |
| PCA (% by weight) | 2.6 | 2.7 | 2.9 | 2 |
| Asphalt | | | | |
| type | STA *4 | STA | STA | STA |
| content of asphaltene (% by weight) | 10 | 10 | 10 | 10 |
| penetration | 70 | 70 | 70 | 70 |
| Properties | | | | |
| workability in mixing | excellent | excellent | good | excellent |
| softening property | good | good | good | good |
| fracture property | good | good | good | good |
| high-loss property at room temperature | excellent | excellent | excellent | fair |
| high-loss property at low temperature | excellent | excellent | excellent | fair |

TABLE 3B

|  | Example 5 | Example 6 | Example 7 |
|---|---|---|---|
| Softening agent | | | |
| addition amount (phr) *1 | 37.5 | 37.5 | 37.5 |
| amount of asphalt added (% by weight) | 10 | 10 | 10 |
| method of mixing | A *2 | A | A |
| high aromatic oil used | 3 | 4 | 5 |
| content of asphaltene (% by weight) | 1.00 | 1.00 | 2.50 |
| % $C_A$ (% by weight) | 22 | 24 | 26 |
| kinematic viscosity | 68 | 70 | 110 |
| PCA (% by weight) | 2.2 | 2.5 | 2.3 |
| Asphalt | | | |
| type | STA *4 | STA | STA |
| content of asphaltene (% by weight) | 10 | 10 | 10 |
| penetration | 70 | 70 | 70 |
| Properties | | | |
| workability in mixing | excellent | excellent | poor |
| softening property | good | good | good |
| fracture property | good | good | good |
| high-loss property at room temperature | excellent | excellent | excellent |
| high-loss property at low temperature | fair | excellent | excellent |

TABLE 3C

|  | Comparative Example 1 | Comparative Example 2 | Comparative Example 3 |
|---|---|---|---|
| Softening agent | | | |
| addition amount (phr) *1 | 37.5 | 37.5 | 37.5 |
| amount of asphalt added (% by weight) | — | 5 | 0.5 |
| method of mixing | A *2 | B *3 | A |
| high aromatic oil used | 1 | 1 | 1 |
| content of asphaltene (% by weight) | 0 | 0.50 | 0.05 |
| % $C_A$ (% by weight) | 26 | 25 | 25 |
| kinematic viscosity | 40 | 62 | 43 |
| PCA (% by weight) | 2.5 | 2.6 | 2.7 |
| Asphalt | | | |
| type | — | STA *4 | STA |
| content of asphaltene (% by weight) | — | 10 | 10 |
| penetration | — | 70 | 70 |
| Properties | | | |
| workability in mixing | excellent | poor | excellent |
| softening property | good | good | good |
| fracture property | poor | good | poor |
| high-loss property at room temperature | poor | excellent | poor |
| high-loss property at low temperature | poor | excellent | poor |

TABLE 3D

|  | Comparative Example 4 | Comparative Example 5 | Comparative Example 6 |
|---|---|---|---|
| Softening agent | | | |
| addition amount (phr) *1 | 37.5 | 0.1 | 125 |
| amount of asphalt added (% by weight) | 50 | 10 | 10 |
| method of mixing | A *2 | A | A |
| high aromatic oil used | 1 | 1 | 1 |
| content of asphaltene (% by weight) | 5.00 | 1.00 | 1.00 |
| % $C_A$ (% by weight) | 25 | 25 | 25 |
| kinematic viscosity | 130 | 71 | 71 |
| PCA (% by weight) | 2.9 | 2.7 | 2.7 |
| Asphalt | | | |
| type | STA *4 | STA | STA |
| content of asphaltene (% by weight) | 10 | 10 | 10 |
| penetration | 70 | 70 | 70 |
| Properties | | | |
| workability in mixing | poor | excellent | poor |
| softening property | poor | poor | fair |
| fracture property | good | fair-b | fair-a |
| high-loss property at room temperature | excellent | poor | excellent |
| high-loss property at low temperature | excellent | poor | excellent |

Notes:
*1: Part by weight per 100 parts by weight of rubber component.
*2: Asphalt was mixed with oil in advance to form softening agent.
*3: Asphalt and oil were mixed separately.
*4: Straight asphalt In Comparative Example 1, the softening agent contained no asphaltene at all. The result of Comparative Example 1 was used as the control.

In Comparative Example 2, the asphalt and the high aromatic oil were separately mixed into the rubber component. The workability in mixing was very poor The results of Examples 1 to 3 and Comparative Examples 3 and 4 show that the rubber composition did not have a sufficiently high high-loss property when the content of asphaltene was less than 0.1% by weight, and the workability was poor when the content of asphaltene exceeded 4% by weight. It is also shown that a rubber composition having a high high-loss property could be easily obtained when the content of asphaltene was within the range specified in the present invention. This effect was more remarkably exhibited when the content of asphaltene was 0.3 to 3.0% by weight.

The results of Examples 2 and 4 to 6 show that the high-loss property of the rubber composition was remarkably high when % $C_A$ was 18 or more. The effect of % $C_A$ on the high-loss property became more remarkable when % $C_A$ was 23 or more and still more remarkable when % $C_A$ was 25 or more.

The results of Examples 3 and 7 show that the workability was improved when the softening agent had a kinematic viscosity of 100 mm²/sec or less.

The results of Comparative Examples 5 and 6 and Example 1 show that the effect of a softening agent was not exhibited when the amount of the softening agent was less than 1 part by weight per 100 parts by weight of the rubber component and that the workability in mixing becomes inferior when the amount of the softening agent exceeds 120 parts by weight.

The results obtained by using the rubber compositions which were prepared in accordance with Formulation (2) shown in Table 2 are shown in Table 4.

TABLE 4

| | Comparative Example 7 | Example 10 | Example 11 | Comparative Example 8 |
|---|---|---|---|---|
| Rubber component | | | | |
| weight-average molecular weight (Mw) | 240,000 | 240,000 | 240,000 | 240,000 |
| bound styrene (% by wt.) | 40.1 | 40.1 | 40.1 | 40.1 |
| content of 1,2-linkage in butadiene portion (%) | 37.0 | 37 | 37 | 37 |
| Softening agent | | | | |
| total amount (phr) *1 | 37.5 | 37.5 | 37.5 | 37.5 |
| addition amount of asphalt (% by weight) | 0 | 10 | 5 | 10 |
| method of extending | C *2 | C | C | D *3 |
| content of asphaltene (% by weight) | 0 | 1 | 0.50 | 1 |
| % $C_A$ (% by weight) | 26 | 26 | 26 | 26 |
| kinematic viscosity | 40 | 71 | 62 | 62 |
| Asphalt | | | | |
| type | — | STA *4 | STA | STA |
| content of asphaltene (% by weight) | — | 10 | 10 | 10 |
| penetration | — | 70 | 70 | 70 |
| Properties | | | | |
| workability in extending | good | good | good | poor |
| workability in mixing | excellent | excellent | excellent | excellent |
| softening property | good | good | good | good |
| fracture properties | poor | good | good | good |
| high-loss property at room temperature | poor | fair | fair | fair |
| high-loss property at low temperature | poor | fair | fair | fair |

Notes:
*1: Part by weight per 100 parts by weight of rubber component.
*2: Asphalt was mixed with oil in advance to form softening agent.
*3: Asphalt and oil were mixed separately.
*4: Straight asphalt In Comparative Example 7, a softening agent containing no asphaltene at all was used as the extender oil of the rubber component (the oil-extended synthetic rubber obtained in the step (B)). The result of Comparative Example 7 was used as the control.

In Comparative Example 8, the asphalt and the oil were extended separately to the polymer solution. The workability in the extending was very poor.

The results of Comparative Example 7 and Examples 10 and 11 show that, when a softening agent containing asphaltene was used as the extender oil, the same effect as that obtained by using the softening agent as the blending oil could be obtained.

What is claimed is:

1. A rubber composition comprising 100 parts by weight of at least one rubber component selected from the group consisting of natural rubber and synthetic rubber and 1 to 120 parts by weight of a softening agent comprising a mixture of processing oil and asphalt and containing 0.1 to 4% by weight of asphaltene.

2. The rubber composition according to claim 1, wherein the softening agent has a content of aromatic carbon (% $C_A$) of 18 or more when measured by a ring analysis according to ASTM D2140.

3. The rubber composition according to claim 1, wherein the asphalt is a straight asphalt.

* * * * *